Aug. 27, 1968  J. WUCHERER  3,398,996
PIVOTED SHOE BEARING

Filed Aug. 5, 1965  4 Sheets-Sheet 1

INVENTOR
JOSEF WUCHERER

BY Dodge and Sons
ATTORNEYS

Aug. 27, 1968        J. WUCHERER        3,398,996
PIVOTED SHOE BEARING

Filed Aug. 5, 1965        4 Sheets-Sheet 3

INVENTOR
JOSEF WUCHERER

BY Dodge and Sons

ATTORNEYS

INVENTOR
JOSEF WUCHERER

BY Dodge and Sons
ATTORNEYS

United States Patent Office 3,398,996
Patented Aug. 27, 1968

3,398,996
PIVOTED SHOE BEARING
Josef Wucherer, Zurich, Switzerland, assignor to Escher Wyss Aktiengesellschaft, Zurich, Switzerland, a corporation of Switzerland
Filed Aug. 5, 1965, Ser. No. 477,509
Claims priority, application Switzerland, Aug. 19, 1964, 10,861/64
12 Claims. (Cl. 308—2)

ABSTRACT OF THE DISCLOSURE

This disclosure relates to a bearing comprising two bearing members which are reversibly movable relatively to one another and pivoted bearing shoes mounted on one of said bearing members so as to form a tapered lubricant containing bearing gap with the other member. A servo operated means is provided to control tilting movement of the shoes. The operating characteristics of the bearing can thus be made uniform despite changes in the direction of rotation.

---

Figure 1:
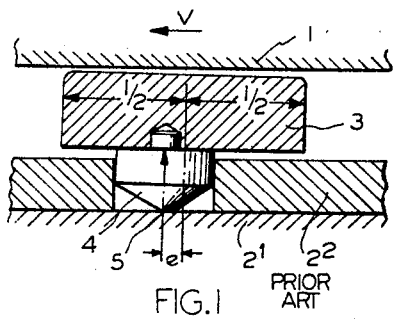
Figure 2:
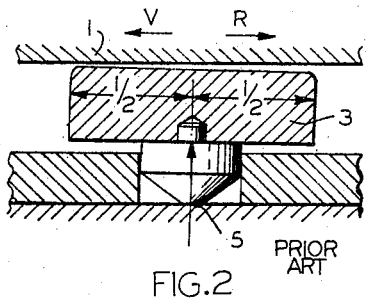

In prior art tilting shoe type bearings, as a rule, the bearing shoes are mounted in the bearing body on a supporting point situated somewhat behind the middle of the bearing shoe in the direction of movement of the rotor, whereby it is possible to attain optimum formation of the lubricating film with correspondingly low bearing friction (liquid friction). FIG. 1 of the accompanying drawings shows an axis-parallel section in the peripheral direction through a part of such a known thrust bearing. The bearing has two relatively movable members, namely a track ring 1, rotating with a shaft (not shown) and a stationary bearing body consisting of parts $2^1$ and $2^2$, and a plurality of bearing shoes 3 of which only one is shown. The bearing shoe is pivoted on the bearing body $2^1$, $2^2$ by means of a supporting element 4, rigidly connected to it, which transmits the force taken up by the bearing shoe 3 to the bearing body part $2^1$. The supporting element 4 is of fixed height and is surrounded with clearance by the bearing body upper part $2^2$, so that it is tiltable about the supporting point 5. In the direction of movement, marked V, of the track ring 1, the supporting point 5 lies by an amount $e$ behind the centre of the bearing shoe 3. The bearing shoe 3 adjusts itself so that it forms with the track ring 1 a lubricant containing bearing gap which narrows in the direction V of the movement of the track ring 1. If, in such a bearing, the shaft is driven in the other direction of rotation, whereby the track ring 1 moves in the opposite direction of rotation, the bearing friction is relatively high. If, however, as shown in FIG. 2, the supporting point 5 of the bearing shoe 3 is arranged in the middle of the latter, the bearing friction is higher for both directions of rotation. Corresponding to the higher bearing friction a larger amount of heat must be dissipated to the exterior, resulting in a poorer overall efficiency. In addition, the oil cooler, and in certain circumstances even the sliding surface, must also be made larger.

It is the aim of this invention to obviate these disadvantages. A bearing which has two relatively movable members and bearing shoes pivoted on one of said members adapted to form with the other member a lubricant containing bearing gap, comprises, according to the invention, servo motor means which act on the shoes and which are controlled so as to be selectively energized in either of two senses depending upon the direction of movement of the two movable members relatively to each other, so that the bearing gap narrows in the direction of said movement.

Constructional examples of the subject of the invention are represented in simplified form in FIGS. 3 to 23 of the accompanying drawings.

Figure 6:
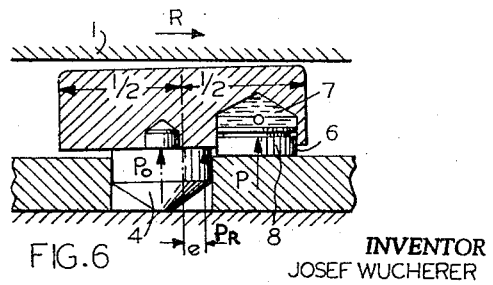
Figure 7:
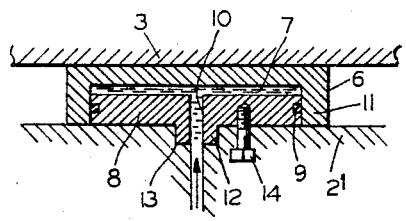
Figure 15:
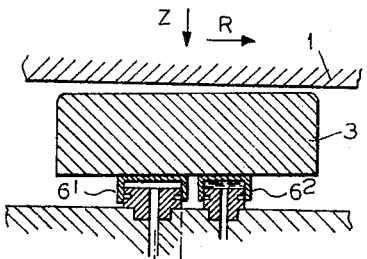
Figure 16:
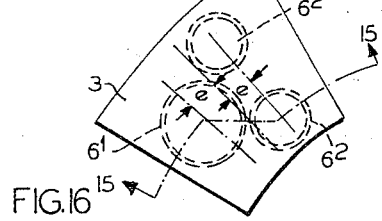
Figure 21:
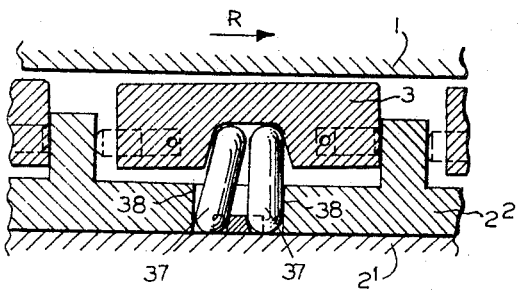
Figure 22:
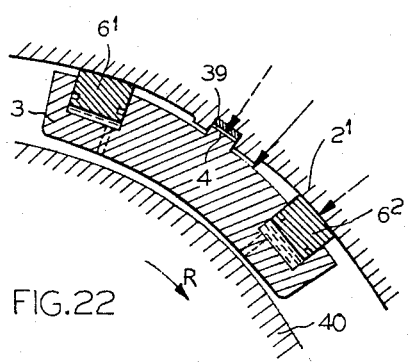
Figure 23:
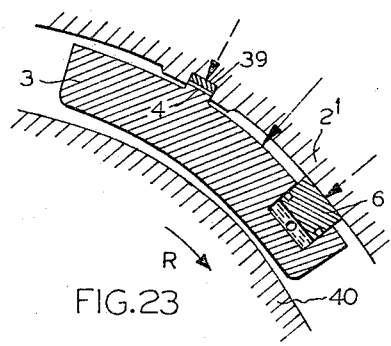

FIGS. 3 to 6, 8 to 14 and 17 to 21 show part sections in the direction of the relative movement through thrust bearings including at least one of the bearing shoes, FIG. 7 shows a section through a supporting element, FIG. 15 is a part section on the line 15—15 of FIG. 16, FIG. 16 is a view in the direction of the arrow Z in FIG. 15, and FIGS. 22 and 23 show part sections through radial bearings at right angles to the axis of rotation.

In all the figures, corresponding parts are provided with the same reference numerals.

In all the illustrated embodiments the bearing shoe has at least two supporting elements offset in relation to each other in the direction of movement of the member sliding on the shoe, of which supporting elements at least one is provided with servo-operated means for varying the transmitted supporting force.

Figure 3:
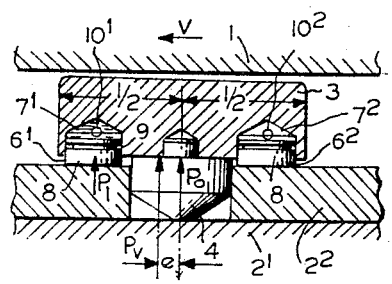
Figure 4:
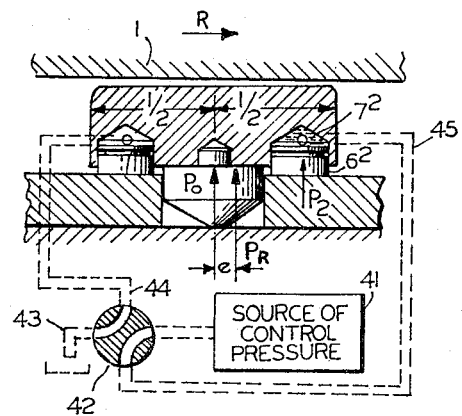

The thrust bearing illustrated in FIGS. 3 and 4 has two relatively movable members 1 and $2^1$, $2^2$, and a plurality of bearing shoes 3, of which only one is shown. Each bearing shoe is pivoted on the stationary member $2^1$, $2^2$ and forms a lubricant gap with the member 1. The bearing shoe 3 has three supporting elements, namely a supporting element 4 and two supporting elements $6^1$ and $6^2$. The supporting element 4, as in the known bearings is tiltable and is of fixed height, but the supporting elements $6^1$ and $6^2$ are provided with servo-operated means for varying the transmitted supporting force and which means may be selectively energized in either of two senses so that the lubricant containing bearing gap tapers in the direction of relative movement of the members 1 and $2^1$, $2^2$. Recessed in the bearing shoe 3 are cylindrical chambers $7^1$ and $7^2$, in which piston-forming lower parts 8 of the supporting elements $6^1$ and $6^2$ can move, joints 9 sealing the gap between cylinder wall and lower part 8. The cylindrical chambers $7^1$ and $7^2$ can be connected by ducts $10^1$ and $10^2$, respectively, and separate supply pipes to a source of pressurized oil or to an oil discharge. The oil supply and discharge means is shown schematically in FIG. 4. It includes a source of control pressure 41, a valve 42, discharge connection 43 and ports 44 and 45 connected with servo-motor chambers $7^1$ and $7^2$, respectively. Valve 42 may be shifted to connect motor $7^2$ with source of control pressure 41 and vent motor $7^1$ as shown in FIG. 4, or the motor $7^1$ may be pressurized and $7^2$ vented as shown in FIG. 3.

In the position in FIG. 3, the member 1 is moving in the direction V and pressurized oil is admitted to the cylindrical chamber $7^1$, and pressure is released in chamber $7^2$. The pressure in the cylindrical chamber $7^1$ is selected to be just so high that the supporting force $P_1$ transmitted by the lower part 8, and the supporting force $P_0$ transmitted by the supporting element 4 have a resultant force $P_V$ displaced by a distance $e$ from the centre of the bearing shoe 3.

In the position shown in FIG. 4, pressurized oil is admitted to the cylindrical chamber $7^2$ and pressure is released in chamber $7^1$. The supporting element $6^2$ transmits a supporting force $P_2$, the resultant force $P_R$ being again at a distance $e$ from the centre of the bearing shoe 3, but on the opposite side to the resultant $P_V$.

The pressurized oil source has, of course, a device for keeping the selected pressure constant, and a pressure reservoir.

Under the influence of the lubricating film, therefore, the bearing shoe 3 will adjust itself just as if it were supported by a single, tiltable supporting element, of fixed height, and transmitting the resultant force $P_V$ or $P_R$. In this way, the shaft bearing has in both directions of rotation the same frictional resistance as the known bearing according to FIG. 1 has in the one direction of rotation shown.

By varying the pressure of the pressure medium source, the position of the resultant force $P_V$ or $P_R$, that is to say the amount $e$, can be varied. By this means it is possible, even during operation of the machine equipped with the bearing, to shift the bearing point, for example by means of measurements of bearing oil temperatures, to the optimum position, which can never be determined exactly by calculation. By this means, it is possible to obtain with the bearing, in both directions of rotation, better results than with the known bearing according to FIG. 1, which furthermore only works well in one direction of rotation.

Figure 5:
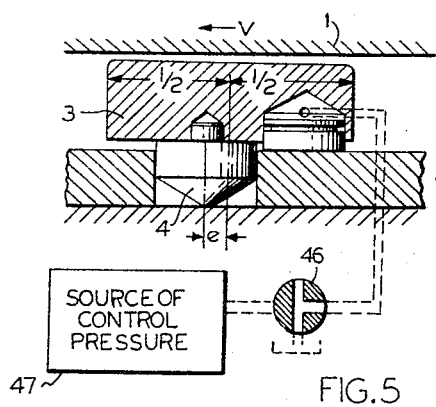

In the constructional example shown in FIGS. 5 and 6, the tiltable, supporting element 4, of fixed height, is spaced by the amount $e$ from the centre of the bearing shoe 3, so that in the direction of movement of the member 1 represented in FIG. 5 by V, supporting by the rigid supporting element 4 alone suffices. As shown in FIG. 5, chamber 7, associated with supporting element 6, is vented through valve 46. For the other direction of movement of the member 1, as shown in FIG. 6, a supporting element 6, provided with means for varying the transmitted supporting force, is arranged near the end of the bearing shoe 3 on the opposite side of the latter to the supporting element 4. The cylindrical chamber 7 of the supporting element 6 is connected through valve 46 with a source of control pressure 47. (See FIG. 5 for a schematic illustration of parts 46 and 47.) Thus the supporting force P transmitted by the lower part 8 and the supporting force $P_0$ transmitted by the supporting element 4 have a resultant force $P_R$ distant by the amount $e$ from the centre of the bearing shoe 3. It will thus be seen that the supporting element 6 is selectively energizable in either of two senses, i.e., it is pressurized or exhausted. In this way the bearing gap tapers in the direction suited to the direction of bearing rotation.

Figure 12:
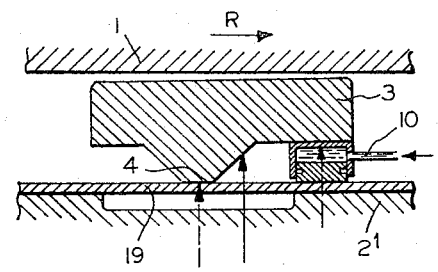

The supporting element 6 shown in FIG. 7 is of very simple construction and can also be subsequently fitted in already existing bearings. It has a cylindrical body 11 and a piston-like lower part 8 provided with a seal 9. The clearance between the cylindrical body 11 and the lower part 8 is such that on the occurrence of differences of inclination between the cylindrical body 11 and the lower part 8, the relative movement of these parts is not impeded. The lower part 8 has a cylindrical extension 12 fitting in a recess 13 in the stationary member $2^1$, and is rigidly connected to the member $2^1$ by means of a screw 14. From the cylindrical chamber 7 of the cylindrical body 11, a duct 10, which is oil-tight from its surroundings, leads through the lower part 8 and bearing body $2^1$ and further to the source of pressurized oil. The pressurized oil could also be supplied by means of a duct passing through the cylindrical body 11, as shown in FIG. 12. Instead of pressurized oil, some other pressure medium my be used, for example air.

Figure 8:
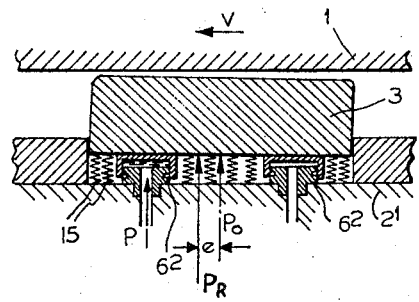

In the bearing shown in FIG. 8, in which the bearing shoe 3 rests on springs 15, supporting elements $6^1$ and $6^2$ are arranged between the bearing shoe 3 and the stationary member $2^1$ at two places spaced apart in the direction of movement of member 1. By the admission of pressure medium to the supporting element $6^1$, the resultant $P_0$ of the individual forces of the springs 15 has a supporting force P associated with it, so that the resultant force $P_R$ of all the forces is again displaced by the desired amount $e$ from the centre of the bearing shoe 3.

Figure 9:
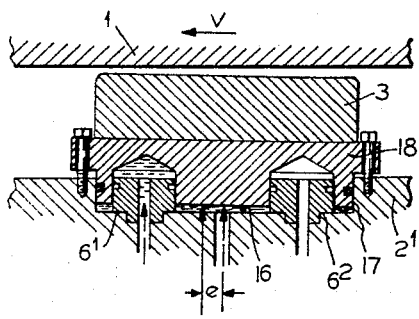

The bearing shoe 3 shown in FIG. 9 rests on a pressurized oil cushion 16 of a pressure chamber confined by a cylindrical or prismatic recess 17 in the bearing body $2^1$ and a piston-shaped supporting plate 18. The surface of the pressure chamber or the pressurized oil cushion 16 is interrupted by two supporting elements $6^1$ and $6^2$, one of which is under oil pressure and the other is without pressure.

Figure 10:
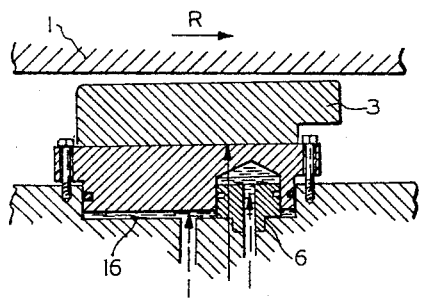

In the bearing according to FIG. 10, the pressure cushion 16 is displaced in relation to the sliding surface of the bearing shoe 3 in the direction of movement of member 1, so that only one supporting element 6, interrupting the pressurized oil cushion, is necessary.

The bearings according to FIG. 9 and FIG. 10 have a device which maintains constant the mean height of the pressurized oil cushion 16.

Figure 11:
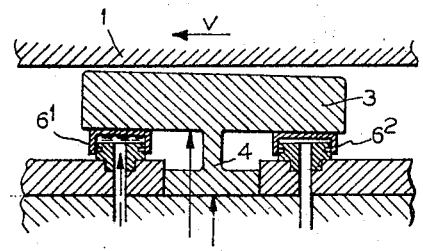

The bearing shoe 3 of the bearing according to FIG. 11 rests on a supporting element 4, which is resiliently bendable but of fixed height, and the supporting elements $6^1$ and $6^2$, to which pressurized fluid can be admitted alternately.

In the bearing shown in FIG. 12, the rigid supporting element 4 is mounted on a resilient plate 19 in the bearing body $2^1$.

Figure 13:
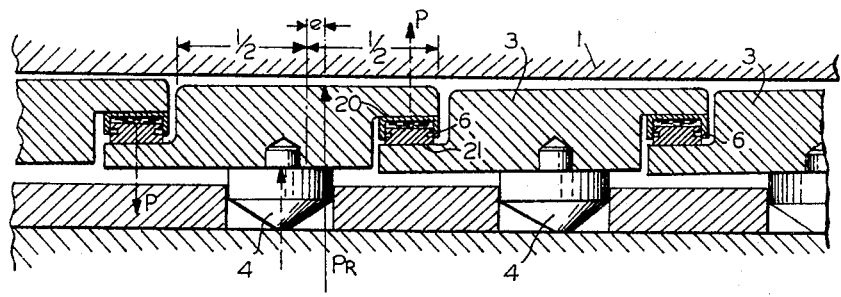

The bearing shoes 3 in FIG. 13 have tiltable supporting elements 4, which are of fixed height and are displaced by the amount $e$ from the centre of the sliding surface of said shoes. The supporting elements 6, provided with servo-operated means for varying the transmitted supporting force are inserted between the facing surfaces 20 and 21 of adjacent overlapping end portions of consecutive bearing shoes 3, so that the supporting elements 6 are able to lift the ends of the bearing shoes 3 provided with the surface 20. The lifting force P exerted by the supporting element 6 corresponds to an equally large force P pressing downward the ends of the bearing shoes 3 provided wth the surface 21, so that when pressure liquid is admitted to the supporting elements 6, a force couple P—P, tilting the bearing shoe, acts on each bearing shoe 3, so that the resultant force $P_R$ is displaced by the amount $e$ beyond the centre of the sliding surface of the bearing shoe 3.

Figure 14:
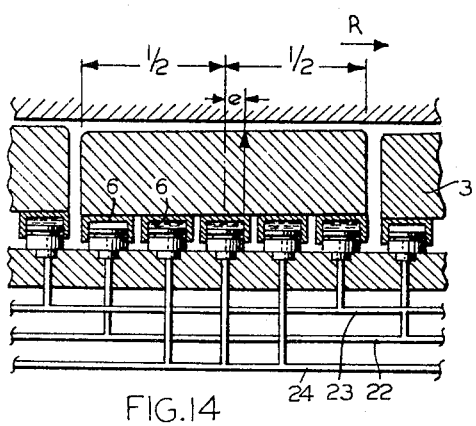

The bearing shoes 3, according to FIG. 14, have a group of supporting elements 6. The first row of supporting elements 6, seen in the direction of movement R of the member 1, is connected to a pressure conduit 22, the last row of supporting elements 6, seen in the direction of movement R, is connected to a pressure conduit 23, and the other supporting elements 6, i.e. the three middle rows, are connected to a pressure conduit 24. If the pressure conduit 22, as shown in FIG. 14, is relieved of pressure, only the three middle rows and the last row are supporting, so that the desired inclination or adjustment of the bearing shoe 3 is obtained. When the direction of movement of the bearing member 1 is reversed, the conduit 22 is put under pressure and the conduit 23 is relieved of pressure. The conduit 24 is always under pressure. The supporting elements 6 of one row, the middle in the direction of movement R, are provided with stops, not shown, which limit the supporting height to a predetermined value. Instead, however, stops could also be provided between the stationary bearing member $2^1$ and the bearing shoe 3, which would limit the vertical position of the bearing shoe 3, that is to say, its distance from the bearing member $2^1$, and would be arranged in the middle of the bearing shoe 3, seen in the direction of movement R.

The bearing shoe 3 according to FIGS. 15 and 16 is provided with supporting elements $6^1$ and $6^2$. The centre of the supporting element $6^1$ is displaced by the amount $e$ from the centre of the sliding surface of the bearing shoe 3. The two supporting elements $6^2$ have together a cylindrical surface of the same size as that of the supporting element $6^1$ alone, and the centres of the supporting elements $6^2$ lie on a line which is again distant from the centre of the sliding surface of the bearing shoe by the amount $e$. For the direction of movement R shown, the supporting elements $6^2$ are put under pressure, and for the other direction of rotation (V), the supporting element $6^1$ is put under pressure. The pressure chambers of the supporting elements $6^1$, $6^2$ may have a cross section of a shape other than cylindrical. The supporting elements $6^1$ and $6^2$ are again provided with stops, not shown, for limiting the supporting height.

Figure 17:
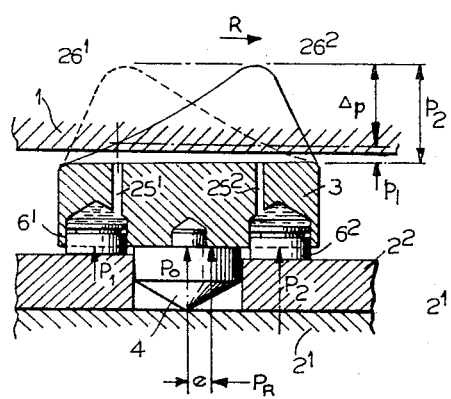

The bearing shown in FIG. 17 corresponds in arrangement and construction of the supporting elements to the embodiment shown in FIG. 3. The pressurized oil source required for acting on the supporting elements $6^1$ and $6^2$, however, is the oil film of the sliding surface of the bearing shoe 3. From the points of the respective pressure maximum of the oil film, a duct $25^1$ or $25^2$ leads downward to the respective supporting element $6^1$ or $6^2$ situated on the same side as the pressure maximum concerned. The pressure distribution of the lubricating film is indicated in the drawing for the direction of rotation R by the line $26^2$. The supporting element $6^2$ is under a pressure $p_2$ corresponding to the pressure maximum, but the supporting element $6^1$ is under a much lower pressure $p_1$. The cylindrical diameter of the two supporting elements $6^1$ and $6^2$, which are of the same size, is selected so that the forces $P_1$ and $P_2$ exerted by the supporting elements have, with the supporting force $P_0$ of the rigid supporting element 4, a resultant force $P_R$ which lies by the amount $e$ off the centre of the sliding surface of the bearing shoe 3. Adjustment of the bearing shoe 3 according to FIG. 17 is effected automatically; on reversal of the direction of rotation, the pressure maximum and with it the resultant force migrates to the other side of the bearing shoe (pressure distribution curve $26^1$). The supporting elements $6^1$, $6^2$ of FIG. 17 may in addition be provided with ducts like $10^1$, $10^2$ of FIG. 3 for allowing pressure release, if desired.

By transferring the duct $25^1$ or $25^2$ to a point of different lubricating film pressure or by providing a different cylindrical diameter for the supporting elements, the inclination of the bearing shoe may also be modified subsequently.

Figure 18:
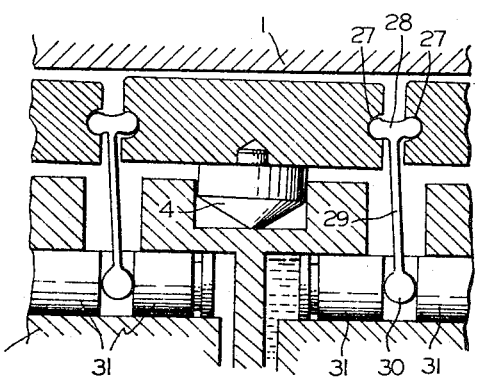

The bearing shoes 3 in FIG. 18 have a tiltable supporting element 4, rigid in height and situated at the centre and a slot 27 at either end. The servo-operated supporting element is a tiltable connecting element 28 engaging with mutually facing recesses 27 of the adjacent end portions of consecutive bearing shoes 3. Each element 28 extends in the direction of movement of member 1 in the resting position, and is connected to a lever 29 at right angles to it. By movement of the free end 30 of the lever 29 in the direction of the sliding surface of member 1, the element 28 can be brought out of its resting position, whereby it forces the end of one bearing shoe upwardly, and that of the adjacent bearing shoe downwardly. All ends 30 must be pressed in the direction opposite to the direction of movement of the member 1, so that they can all be connected to a common adjusting device, small differences in dimension being compensated by greater or lesser resilient deflection of the levers 29. In the embodiment shown in FIG. 18, on the contrary, each lever 29 is provided with its own pressure fluid operated servomotor 31.

Figure 19:
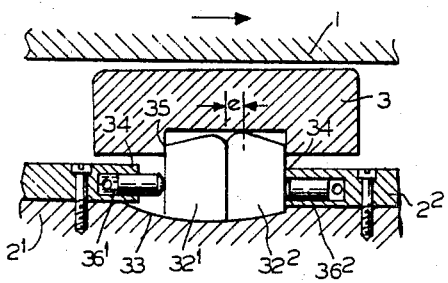

In the embodiment shown in FIG. 19, the bearing shoe 3 is carried by two supporting elements $32^1$, $32^2$, which are provided with means for varying the transmitted supporting force. The two supporting elements $32^1$, $32^2$, which could together also consist of a single piece, are provided on their lower end facing the stationary member $2^1$ with a spherical surface, by means of which they rest on a corresponding concave spherical surface 33 of the member $2^1$, common to the two supporting elements $32^1$, $32^2$, and are movable in a range limited by two stops 34 of the part $2^2$ fixed to the member $2^1$. Instead of the spherical surface and the concave spherical surface it would also be possible to provide a surface pair with another convex and concave surface.

When the supporting elements $32^1$, $32^2$ turn about the centre of the concave surface 33, the distance of the upper end of the supporting elements $32^1$, $32^2$ from the sliding surface of the movable member 1 is varied. In the position shown, the supporting element $32^2$ situated on the right in the drawing is nearer the sliding surface of the member 1, and carries the bearing shoe 3. The supporting element $32^1$, situated on the left in the drawing, lies lower in the concave spherical surface 33 and is farther away from the sliding surface of the track ring 1, so that a clearance is left between the supporting element $32^1$ and the bearing shoe 3, even though the bearing shoe 3, as shown in the drawing, is already at an inclination to the member 1 under the influence of the oil film between bearing shoe 3 and member 1.

Stops 35 prevent displacement of the bearing shoe 3 in relation to the supporting elements $32^1$, $32^2$ in the sliding direction of the bearing. Servomotors $36^1$ and $36^2$ are arranged in the part $2^2$ between the supporting elements $32^1$, $32^2$ and the stationary member $2^1$. By means of the servomotor $36^2$, the supporting elements $32^1$, $32^2$ can be shifted to the left out of the position shown in the drawing, the supporting element $32^2$ being thereby relieved of load and the supporting element $32^1$ being loaded. By means of the servomotor $36^1$, the bearing shoe 3 can be pushed back into the position in the drawing.

Figure 20:
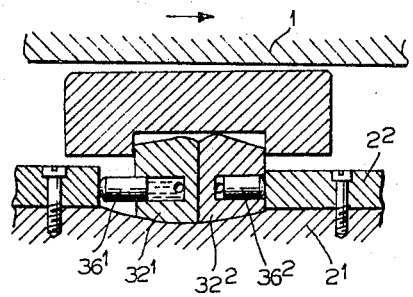

Whereas the servomotors $36^1$, $36^2$ of FIG. 19 are situated in the part $2^2$, which is immovably connected to the stationary member $2^1$, in the bearing shown in FIG. 20, the servomotors $36^1$, $36^2$ are respectively accommodated in one of the supporting elements $32^1$ and $32^2$.

In the bearing according to FIG. 21, the bearing shoe 3 is carried by two separate supporting elements 37, the lower end of each of which lies in a trough in the stationary member $2^1$ or part $2^2$ fixed thereto, while their upper ends are tiltably mounted in a trough in the bearing shoe 3. The two troughs in the stationary parts $2^1$, $2^2$ are farther apart than the two troughs in the bearing shoe 3. Stops 38 in part $2^2$ limit the movement of the supporting elements 37 in the direction away from each other, so that the particular supporting element 37, which is lying against a stop 38, is substantially at right angles to the sliding surface of the member 1. The other supporting element 37 is then inclined to the sliding surface of the member 1. Consequently, the perpendicular supporting element 37 is loaded, but the inclined element 37 is relieved of load.

In the bearings according to FIGS. 19 to 21, the bearing shoe 3 together with the supporting elements must always be displaced in the instantaneous direction of rotation, that is to say, the frictional forces between the member 1 and bearing shoe 3 press the bearing shoe 3 always toward the correct position. The friction between the supporting elements $32^1$, $32^2$, 37 and the bearing body $2^1$ may be reduced by good lubrication. More particularly, in the embodiments according to FIGS. 19 and 20, friction between supporting element and bearing body during the displacement operation may be practically eliminated by hydrostatic support.

The bearings shown in FIGS. 22 and 23 are radial bearings corresponding to the thrust bearings shown in FIGS. 17 and 6, respectively. The other embodiments shown as examples of an axial thrust bearing may also be applied to radial bearings. In the radial bearings shown, shim plates 39 are inserted between the stationary member $2^1$ and rigid supporting element 4 for adjusting the distance of the bearing shoe 3 from the sliding surface of the shaft 40.

If the load on the shoes 3 is not the same on forward running as on backward running, the pressure surfaces of the supporting elements $6^1$ and $6^2$ and/or the pressure of the control medium can be made correspondingly different.

What is claimed is:

1. A bearing comprising two members reversely movable relatively to each other; bearing shoes pivoted on one of said members and forming with the other of said members a lubricant containing bearing gap; servo-motor means acting on said shoes and selectively energized in either of two senses depending upon the direction of movement of said members relatively to each other and supplementing the tilting action exerted on the shoes by lubricant in said gap; and control means selectively energizing said motor means in one or the other of the two senses whereby the tilt of the bearing shoes is adjusted for opposite directions of relative movement of said other member with respect to the bearing shoes so that the gap narrows in the direction of said relative movement.

2. The bearing defined in claim 1 in which each bearing shoe has at least two supporting elements disposed offset in relation to each other in the direction of the relative movement of asid members; at least one of said supporting elements being mounted on said one member and at least one of said supporting elements being provided with said servo-motor means adjusting the tilt of the bearing shoe.

3. The bearing defined in claim 2 in which the servo-motor means comprise a hydraulic servomotor.

4. The bearing defined in claim 3 in which the supporting element provided with the hydraulic servomotor is mounted on said one member.

5. The combination bearing defined in claim 3 in which one of said supporting elements is of fixed height but tiltable and the other comprises the hydraulic servomotor.

6. The bearing defined in claim 3 in which each bearing shoe has three supporting elements disposed offset in relation to each other by means of which the bearing shoe is mounted on said one member, one of said supporting elements being tiltable but of fixed height and disposed in the centre of the bearing shoe and the other two supporting elements being disposed on either side of the rigid supporting element, each comprising a hydraulic servomotor adjusting the tilt of the bearing shoe.

7. The bearing defined in claim 6 in which the bearing shoes have flow connections between the bearing gap and the hydraulic servomotors so as to use the lubricant under pressure of the bearing gap as an actuating means for the hydraulic servomotors.

8. The bearing defined in claim 3 in which the supporting element provided with the hydraulic servomotor is mounted between the adjacent ends of two consecutive bearing shoes.

9. The bearing defined in claim 8 in which conescutive bearing shoes have adjacent end portions overlapping each other and in which the hydraulic servomotor is arranged between the opposite faces of the overlapping end portion.

10. The bearing defined in claim 8 in which the servo-operated supporting element is a tiltable conecting element, arranged between consecutive bearing shoes and extending substantially in the direction of the relative movement of the members, and in which the hydraulic servomotor is operatively connected with said connecting element so as to vary the tilt of the connecting element whereby the opposite ends of the consecutive bearing shoes are shifted in relation to each other in a direction perpendicular to the direction of the relative movement of the members.

11. The bearing defined in claim 10, in which the opposite end faces of the consecutive bearing shoes are provided with recesses receiving the ends of said connecting element.

12. The bearing defined in claim 1 in which each bearing shoe has two supporting elements disposed offset in relation to each other between the bearing shoe and the member on which it is mounted; said supporting elements being arranged on either side of the centre of the bearing shoe; and the servo-motor means allowing movement of said supporting elements between a position in which the bearing shoe is supported solely by one of the supporting elements and a position in which the bearing shoe is supported solely by the other supporting element.

References Cited

UNITED STATES PATENTS

| | | | |
|---|---|---|---|
| 1,437,788 | 12/1922 | Wadsworth | 308—160 |
| 1,754,324 | 4/1930 | Kingsburg | 308—160 |
| 2,606,081 | 8/1952 | Moller | 308—73 |
| 2,844,415 | 7/1958 | Ryder | 308—9 X |
| 2,873,152 | 2/1959 | Thompson | 308—73 |
| 2,885,915 | 5/1959 | Schurger | 308—9 X |
| 2,986,431 | 5/1961 | Block | 308—160 |
| 3,023,055 | 2/1962 | Thompson | 308—73 |
| 3,093,426 | 6/1963 | Cornford | 308—73 |
| 3,101,980 | 8/1963 | Love | 308—122 |
| 3,155,438 | 11/1964 | Ruegg | 308—122 X |
| 3,208,395 | 9/1965 | Budzich | 308—9 X |
| 1,441,614 | 1/1923 | Wadsworth. | |
| 1,445,188 | 2/1923 | Wadsworth. | |

FOREIGN PATENTS 1,040,857 10/1958 Germany.
721,131 12/1954 Great Britain.

MARTIN P. SCHWADRON, *Primary Examiner.*

L. L. JOHNSON, *Assistant Examiner.*

UNITED STATES PATENT OFFICE
CERTIFICATE OF CORRECTION

Patent No. 3,398,996                              August 27, 1968

Josef Wucherer

It is certified that error appears in the above identified patent and that said Letters Patent are hereby corrected as shown below:

Column 7, line 13, "asid" should read -- said --; line 22, cancel "combination"; line 46, "portion" should read -- portions --.

Signed and sealed this 6th day of January 1970.

(SEAL)
Attest:

Edward M. Fletcher, Jr.

Attesting Officer

WILLIAM E. SCHUYLER, JR.

Commissioner of Patents